United States Patent [19]
Tenneson et al.

[11] 3,913,235
[45] Oct. 21, 1975

[54] APPARATUS FOR MARKING PANEL

[76] Inventors: Milton T. Tenneson, Frost; Arno A. Mathews, Blue Earth, both of Minn.

[22] Filed: June 10, 1974

[21] Appl. No.: 478,027

Related U.S. Application Data
[62] Division of Ser. No. 321,325, Jan. 8, 1973.

[52] U.S. Cl. ............ 33/174 G; 33/197; 33/DIG. 10
[51] Int. Cl.² ...................... B25H 7/04; G01B 3/14
[58] Field of Search ........... 33/DIG. 10, 174 G, 197, 33/174 B; 101/333, 384; 206/223

[56] References Cited
UNITED STATES PATENTS

| | | | |
|---|---|---|---|
| 521,287 | 6/1894 | Ingersoll | 101/384 X |
| 2,222,333 | 11/1940 | Wenzel et al. | 101/384 |
| 2,775,812 | 1/1957 | Mohr | 33/DIG. 10 |
| 2,778,306 | 1/1957 | Harris | 101/333 |
| 2,898,688 | 8/1959 | Cottar | 33/197 X |
| 3,279,080 | 10/1966 | Stepshinski | 33/DIG. 10 |
| 3,311,227 | 3/1967 | David et al. | 206/223 X |
| 3,745,664 | 7/1973 | Altseimer | 33/174 G |

*Primary Examiner*—William D. Martin, Jr.

[57] ABSTRACT

A marking apparatus attachable to a switch box or outlet box for marking the outer peripheral outline of the box on a panel, as a plywood panel. The marking apparatus has a generally rectangular glat base plate having a plurality of projections on one side of the plate. The projections cooperate with portions of the box to releasably hold the plate adjacent the face or open end of the box. A marking member is mounted on the opposite side of the plate. The marking member has a rectangular shape and is of a size to indicate the outline of the outer peripheral edges of the box. The marking member can be an elongated rib or resilient material that retains ink or similar marking media which will transfer to a panel that is positioned in engagement with the marking material.

8 Claims, 9 Drawing Figures

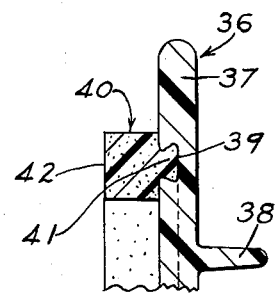
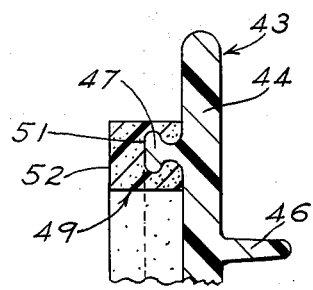
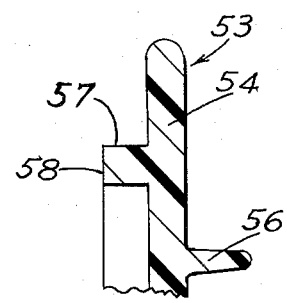
FIG. 5          FIG. 6          FIG. 7
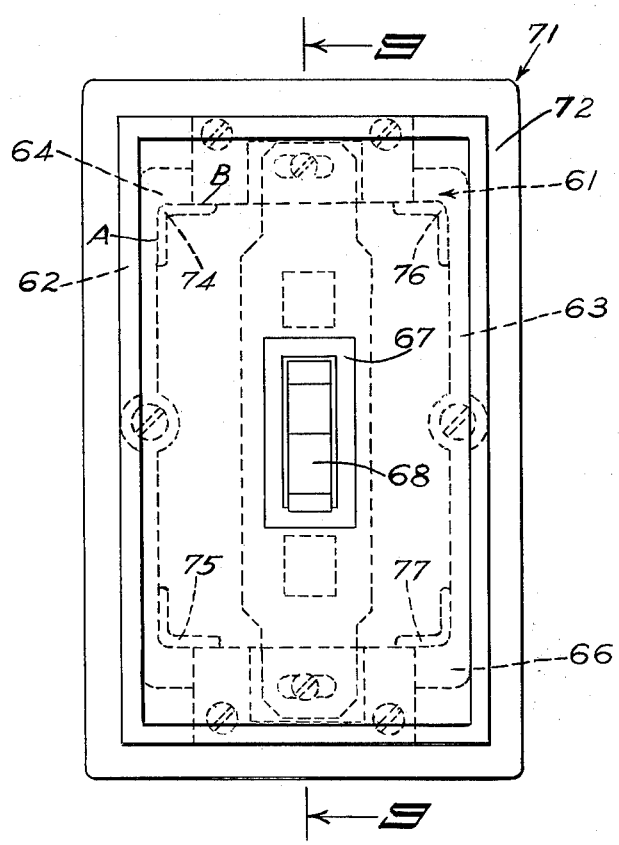
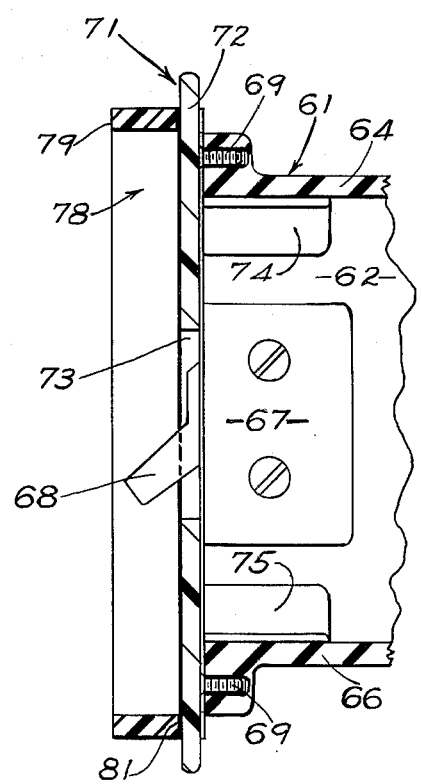
FIG. 8          FIG. 9

APPARATUS FOR MARKING PANEL

This is a division of application Ser. No. 321,325 filed Jan. 8, 1973.

BACKGROUND OF THE INVENTION

Panels, as finished plywood, are commonly used as wall construction in commercial and residential property. Conventional electrical wiring includes electrical members as switch boxes and outlet boxes attached to the wall furring providing supports for the panels. It is recommended that the switch boxes and outlet boxes finish flush with the face of the panel. If the paneling is applied over existing plaster or gypsum board, without furring, the screws holding the switch or outlet boxes can be loosened to permit the boxes to finish flush with the outside face of the paneling. The panel requires a cutout opening for the outlet boxes so the boxes will finish flush with the outer face of the panel. The location of the cutout opening in the panel is determined by measuring the horizontal distance from the edge of the previously installed panel and the vertical distance from either the floor or ceiling. A generally rectangular outline is marked on the panel equal to the size of the electrical member in the location determined by the horizontal and vertical measurement. Holes are then drilled in the panel and a keyhole or sabre saw is used to cut out the opening for the electrical member along the marked lines. This measuring method of determining the cutout opening for the electrical member is subject to error. The measurement from the installed panel to the box and the floor to the box can easily be applied to the wrong area of the panel, whereby the marking on the panel to be installed will not be a true outline of the position of the box relative to the panel to be installed.

SUMMARY OF THE INVENTION

The invention is directed to an apparatus for marking a panel, as plywood, in a manner whereby the panel is marked so that it can be cut out to accurately accommodate a member, as a switch box or outlet box. The apparatus has a base adapted to fit over the open end of the box. The apparatus has a base adapted to fit over the open end of the box. A first means cooperates with the base to releasably connect the base to the box. A second means on the base is used for marking the panel when the apparatus is mounted on the box and the panel is moved against the second means. The second means outlines an area on the panel which when cut out provides an opening for the box.

An object of the invention is to provide a marking apparatus for a panel which can be readily attached to an electrical outlet box and used to mark an outline of the box on a panel. A further object of the invention is to provide a marking device for applying an outline on a panel which does not require adjustment or separate parts to attach the device to an existing electrical switch or outlet box. A further object of the invention is to provide a marking apparatus which is simple in construction, reuseable, low in cost and accurate.

IN THE DRAWINGS

FIG. 5 is an enlarged sectional view of a portion of a modified marking apparatus;

FIG. 6 is a sectional view similar to FIG. 5 showing a second modification of the marking apparatus;

FIG. 7 is a sectional view similar to FIG. 4 of a third modification of the marking apparatus;

FIG. 8 is an enlarged plan view similar to FIG. 2 of a fourth modification of the marking apparatus mounted on a switch box; and FIG. 9 is a sectional view taken along the line 9—9 of FIG. 8.

Figure 1:
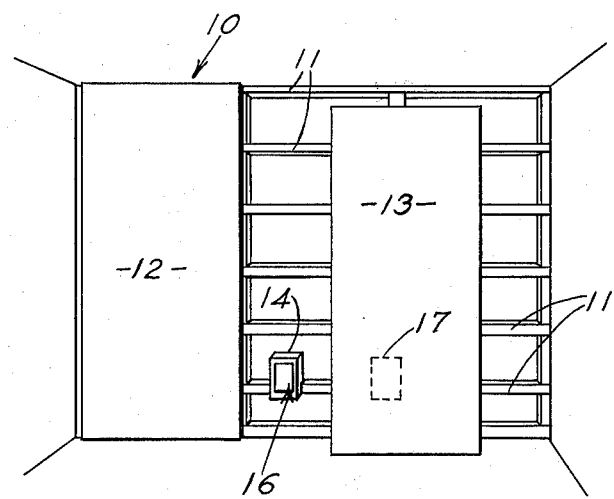
FIG. 1 is a front elevational view of a partially constructed wall having an electrical outlet box and the next panel to be applied to the wall.

Referring to FIG. 1, there is shown a partially constructed wall, indicated generally at 10, commonly found in a room or divider of a commercial or residential property. Wall 10 has furring 11. A panel 12 is attached to furring 11 with conventional nails or adhesive. Panel 13 is the next panel to be attached to furring 11. Mounted on furring 11 is an electrical outlet box 14. Other electrical members, as outlet boxes and switch boxes, can be mounted on the furring 11. The outlet and switch boxes can be double outlet and switch boxes.

Figure 2:
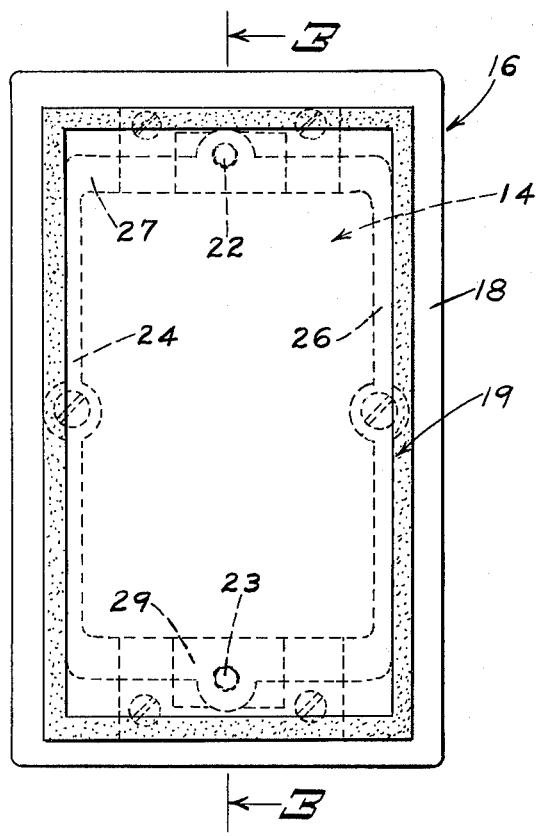
FIG. 2 is an enlarged plan view of the marking apparatus of the invention attached to the electrical outlet box.
Figure 3:
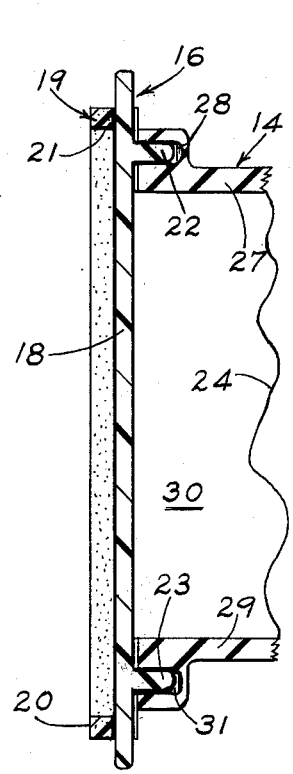
FIG. 3 is a sectional view taken along the line 3—3 of FIG. 2.

Referring to FIGS. 2 and 3, a marking apparatus indicated generally at 16 is releasably mounted on box 14. Marking apparatus 16 has a rectangular flat base or plate 18. Mounted on the outside surface of plate 18 is a marking member indicated generally at 19. The marking member 19 is a linear resilient strip of plastic foam, foam rubber or rubber which retains marking fluids, as ink and the like. The marking member 19 can be any material that will hold sufficient marking media, as ink, graphite or like material which will mark a panel. The marking member 19 has a rectangular shape and a flat outside face 20. As shown in FIG. 2, the marking member 19 has vertical and horizontal portions generally parallel to the outer edges of base 18 outlining the outer peripheral edges of box 14. A bonding material 21, as glue or adhesive, secures the marking member 19 to the outside surface or face of base 18. A plurality of projections 22 and 23 extend from the inner side of the base member 18. Projections 22 and 23 have a slight converging taper and comprise short legs or spikes which cooperate with the box to frictionally hold the apparatus in assembled relation with the electrical box 14. Base 18 and projections 22 and 23 are made of electrically insulative material, as plastic or hard rubber.

Box 14 has upright side walls 24 and 26, top end wall 27 and bottom end wall 29 defining a chamber 30 for an electrical outlet or switch. Top end wall 27 has a threaded hole 28. A similar threaded hole is located in bottom end wall 29. The tapered projections 22 and 23 are located in positions on base 18 aligned with holes 28 and 31 to frictionally hold the marking apparatus 16 in assembled relation with box 14, as shown in FIG. 3. Projections 22 and 23 can be replaced with screws that extend through holes in the base and are turned into the threaded holes 28 and 31.

In use, the marking apparatus 16 is releasably mounted on switch box 14 by inserting the projections 22 and 23 into holes 28 and 31 respectively. The projections 22 and 23, being slightly tapered, are force fit into the holes 28 and 31 to firmly mount the marking apparatus 16 on the box 14. Marking member 19 carries a marking material, as ink or the like. The panel 13 which is to be secured to furring 11 is aligned with panel 12 and moved into engagement with marking member 19. Marking media, as ink, in marking member 19 places an outline of the outer peripheral edge of box 14 peripheral the back of the panel. This outline conforms to the position as well as the size of the box 14. The opening for the box in the panel is made by drilling holes in the panel to allow a keyhole or sabre saw to cut along the marked outline. After the panel is marked, the marking apparatus 16 is removed from box 14 by merely pulling the panel away from the box, thereby removing projections 22 and 23 from the holes 28 and 31 respectively. The marking apparatus 16 can be used to mark additional panel after additional marking media is applied to the marking member 19.

Figure 4:
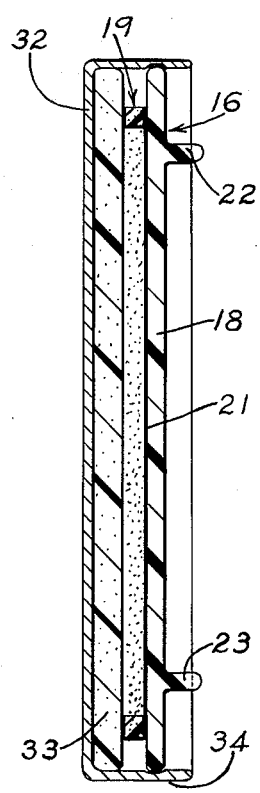
FIG. 4 is a sectional view of the marking apparatus similar to FIG. 3 positioned in a storage container.

FIG. 4 shows the marking apparatus 16 located in a pan or tray 32. Positioned in the bottom of tray 32 is a pad 33, as an ink pad, for storing and applying ink to the marking member 19. Tray 32 has a continuous upright side wall or flange 34 which surrounds the outer peripheral edge of the base member 18. Base 18 serves as a cover for the tray 32 enclosing pad 33.

Referring to FIG. 5, there is shown a modification of the marking apparatus indicated generally at 36. Apparatus 36 has a generally rectangular base 37 which is of a size corresponding to base 18. Base 37 has a projection or leg 38 for releasably attaching the base to an electrical box. Additional legs project from base 37 similar to projection 23 shown in FIG. 3. Base 37 has an undercut groove 39 extended around the base in a rectangular pattern similar to the pattern of the marking member 19 shown in FIG. 2. Groove 39 has a generally flat bottom and inwardly directed sides providing a generally flat bottom and inwardly directed sides providing a generally dovetail groove. Located around the base member 37 is a marking member 40 having a portion 41 located in the groove 39 to mount the marking member on base member 37. An adhesive may also be used in groove 39 to hold the marking member 40 in assembled relation with base 39. Marking member 40 has a generally flat outside face 42 providing a contact face for applying marking material, as ink, to the panel.

Referring to FIG. 6, there is shown a second modification of the marking apparatus indicated generally at 43. Apparatus 43 has a generally flat base 44 carrying a plurality of outwardly directed projections or legs 46. An outwardly directed rib or bead 47 extends around the the base 44 from theoutside surface thereof. The rib 47 has a narrow neck 48. A marking member indicated generally at 49 is positioned on rib 47. The marking member 49 has a groove 51 that conforms to the shape of the rib 47 and neck 48 to hold the marking member 49 on the base 44. The marking member 49 has a generally flat outside face 52. The rib 47 extends horizontally and vertically around the plate member 44 in a pattern similar to marking member 19 shown in FIG. 3.

Referring to FIG. 7, there is shown a third modification of the marking apparatus indicated generally at 53. Apparatus 53 has a generally flat base 54 carrying a plurality of outwardly directed projections or legs 56. Projections 56 are adapted to be releasably attached to an electrical box, as shown by projections 22 and 23 in FIG. 3. The outside face of base member 54 has an outwardly directed rib or flange 57. Flange 57 has a generally flat outside face 58. Face 58 can have an irregular or rough surface so as to retain a film of ink or other suitable marking material that will transfer onto the panel. Rib 57 extends transversely and longitudinally around the base member 54 in a manner similar to the marking member 19 shown in FIG. 3. Base member 54, projections 56 and rib 57 are formed from a one-piece member such as molded plastic.

Referring to FIG. 8, there is shown a fourth modification of the marking apparatus indicated generally at 71 mounted on a switch box indicated generally at 61. Switch box 61 has upright side walls 62 and 63 joined to a transverse top end wall 64 and a bottom transverse end wall 66. A toggle switch 67 is located in the space between the walls and is secured to the top and bottom end walls with fasteners 69, as screws. Switch 67 has a movable actuator 68.

The marking apparatus 71 is mounted on the front of the box 61. Apparatus 71 is a generally flat one-piece base 72 having a central hole 73 for the actuator 68. A plurality of outwardly directed projections, legs or spikes 74, 75, 76 and 77 are attached to the back of base member 72. As shown in FIG. 8, each projection has a generally right angle member having normally disposed external surfaces A and B. Surface A engages a side wall. In a similar manner surface B engages an end wall. The projections 74, 75, 76 and 77 engage the corner portions of the inside walls of the box 61. Each of the surfaces A and B of the projections are tapered inwardly whereby the marking apparatus can be mounted in frictional engagement with box 61. The projections 74–77 can have other shapes such as square, round, triangular or the like. Projections 74–77 can be replaced with a pair of projections as shown in FIG. 2 to fit into the screw holes in the box. In use, the screws 69 holding the switch 67 must be removed to mount the marking apparatus on the box 61.

A marking member indicated generally at 78 comprising a generally rectangular shaped resilient pad of plastic or rubber foam material is located on the outside face of the base 72. The marking member 78 has a generally flat outside face 79 that extends around the base 72 to define a generally rectangular outline. The rectangular outline, shown in FIG. 8, defines the outside dimensions of the box 61. Bonding material 81, as adhesive, secures the marking member 78 to base 72. The marking member can be attached to the base plate in other manners, including the structures shown in FIGS. 5 and 6. Alternatively, the marking member can be a rib or flange integral with base 72, as shown by rib 57 in FIG. 7.

In use, the marking apparatus 71 is mounted to the switch box 61 by inserting the projections 74–77 into the chamber into engagement with the side walls and the end walls. The projections 74–77 are in a relatively tight fit with the walls of the box 61 to firmly hold the marking apparatus on the box. The marking member 78 carries a marking material, as ink. The panel to be applied to the wall is aligned with the panel on the wall and moved into engagement with the marking member 78. The ink in the marking member 78 places an outline of the box on the panel. This outline conforms to the position as wall as the size of the electrical box. The opening for the box in the panel is made by drilling the necessary holes to enable a keyhole or sabre saw to cut along the marked outline. After the panel is marked, the apparatus 16 is removed from the box so that the panel can be attached to furring 11.

The marking apparatuses 36, 43, 53 and 71 can be inked and stored in a tray as shown in FIG. 4. Ink or other marking media can be applied to the marking member with a brush or dispenser. Suitable containers and dispensers for applying ink to the marking member are shown in U.S. Pat. No. 3,132,370 and U.S. Design Pat. No. 194,711.

While there have been shown and described preferred embodiments of the invention, it is understood that various changes in materials and shapes and marking members may be made by those skilled in the art without departing from the spirit of the invention. For example, the marking apparatus can have a size to mark the outline of a double switch or outlet box on a panel.

The embodiments of the invention in which an exclusive property or privilege is claimed are defined as follows:

1. An apparatus for marking a panel whereby the marked portion of the panel can be cut to provide an opening to accommodate a rectangular member, as a switch box, outlet box or the like in which is mounted structure projecting from the member, comprising: a flat, generally rectangular base, first means cooperating with the base adapted to be releasably connected to the member with one side of the base adjacent the member, said base having second means for marking the panel with marking media when the apparatus is connected to the member and the panel is moved against the second means, said base having a centrally located rectangular opening for accommodation of structure projecting from said member when the apparatus is connected to the member, said second means including flange means outwardly extended from the plane of the base on the side of the base opposite the side adjacent the member, said flange means having sides and ends parallel to the sides and ends of the base surrounding said opening to extend beyond structure projecting from said member and defining a rectangle smaller than the rectangle of the base, said sides and ends of the flange means having generally flat outside face means, means on said face means for carrying marking media, said marking outlining an area on the panel which when cut out provides an opening for the member, and tray means for holding the base, said tray means having means for storing marking media and wall means having a configuration matching a portion of the base to hold the second means in engagement with the means for storing marking media whereby marking media is transferred to the second means.

2. The apparatus of claim 1 wherein: the base is a generally flat plate, said first means comprising a plurality of projections on one side of the plate, said second means being mounted on the other side of the plate.

3. The apparatus of claim 1 wherein: the base is a generally flat plate, said plate has a groove, said second means having a member having a portion located in the groove.

4. The apparatus of claim 1 wherein: the base is a generally flat plate, said plate has a rib means projected outwardly from one side of the plate, said second means having a member having a groove receiving said rib means to attach the second means to the plate.

5. The apparatus of claim 1 for a member having a pair of holes wherein: said first means comprise a pair of projections adapted to frictionally fit into said pair of holes.

6. The apparatus of claim 1 for a member having side walls and end walls surrounding a chamber wherein: said first means comprise a plurality of projections extendable into the chamber and engageable with at least some of said walls to frictionally hold the apparatus on the member.

7. The apparatus of claim 6 wherein: each projection has portions engageable with a side wall and an end wall.

8. The apparatus of claim 1 for a member having a pair of holes wherein: the first means includes a pair of means cooperating with the base and the holes to attach the base to the member.

* * * * *